(12) United States Patent
Nordstrom et al.

(10) Patent No.: US 9,997,983 B2
(45) Date of Patent: Jun. 12, 2018

(54) MULTIPLE WINDING DESIGN FOR SINGLE OR POLYPHASE ELECTRIC MOTORS WITH A CAGE TYPE ROTOR

(71) Applicant: Performa, LLC

(72) Inventors: Erling S. Nordstrom, Old Town, FL (US); Daniel De Jesús, Holiday, FL (US)

( * ) Notice: Subject to any disclaimer, the term of this patent is extended or adjusted under 35 U.S.C. 154(b) by 530 days.

(21) Appl. No.: 14/618,493

(22) Filed: Feb. 10, 2015

(65) Prior Publication Data

US 2016/0204683 A1    Jul. 14, 2016

Related U.S. Application Data

(60) Provisional application No. 62/101,121, filed on Jan. 8, 2015.

(51) Int. Cl.
| | | |
|---|---|---|
| *H02K 17/08* | (2006.01) | |
| *H02K 3/28* | (2006.01) | |
| *H02K 17/12* | (2006.01) | |
| *H02K 17/16* | (2006.01) | |

(52) U.S. Cl.
CPC ............ *H02K 17/08* (2013.01); *H02K 3/28* (2013.01); *H02K 17/12* (2013.01); *H02K 17/16* (2013.01)

(58) Field of Classification Search
CPC ........ H02K 17/08; H02K 17/12; H02K 17/16; H02K 3/28
See application file for complete search history.

(56) References Cited

U.S. PATENT DOCUMENTS

| | | | |
|---|---|---|---|
| 4,187,457 A | | 2/1980 | Wanlass |
| 4,446,416 A | | 5/1984 | Wanlass |
| 4,772,814 A | * | 9/1988 | Lewus .................. H02K 17/08 310/166 |
| 4,794,288 A | * | 12/1988 | Lewus .................. H02K 17/08 310/68 B |
| 4,808,868 A | | 2/1989 | Roberts |
| 4,959,573 A | | 9/1990 | Roberts |
| 6,331,760 B1 | | 12/2001 | McLane, Jr. |
| 6,788,031 B2 | | 9/2004 | Pendell |
| 7,034,426 B2 | | 4/2006 | Goche |
| 7,227,288 B2 | | 6/2007 | Goche |

* cited by examiner

*Primary Examiner* — Dang Le
(74) *Attorney, Agent, or Firm* — Eugenio J. Torres-Oyola; Victor Rodriguez-Reyes; Ferraiuoli LLC

(57) ABSTRACT

An electric motor, with a cage type rotor, of single or polyphase design having a multiple winding design in a single stator core. Where the primary winding and secondary winding having a magnetically and electric circuit configured alignment, that is a 0° difference in the respective magnetic alignments or the electric circuitry alignments. Yet completely separate and isolated from one another, electrically and physically. Wherein the prime operative function is configured in a series resonant and a parallel resonant circuit, using capacitors to produce a phase shift in the secondary winding. With the ability to be reconfigured to a secondary operative function, identical to the original winding and in all of its original operative designed functions.

18 Claims, 10 Drawing Sheets

MULTIPLE WINDING DESIGN FOR SINGLE OR POLYPHASE ELECTRIC MOTORS WITH A CAGE TYPE ROTOR

STATEMENT REGARDING FEDERALLY SPONSORED RESEARCH AND DEVELOPMENT

N/A

RELATED APPLICATIONS

N/A

BACKGROUND OF THE DISCLOSURE

Field of the Disclosure

The invention relates to single or polyphase electric motors with a cage type rotor. Particularly this invention relates to these induction motors to operate at a higher power factor, for which therein is a reduction in the vector sum of the reactive power (kilovolt-amperes reactive/kvar). That is the angle of degrees between the real power (kilowatts/kw) and apparent power (kilovolt-amperes/kva) vectors without any sacrifice to the operational output of the motor, e.g. horsepower, torque, rpm, in any and all ranges of operational loading, from idle to full load.

Discussion of the Background

With the present rising cost of utilities, specifically electric power cost. The rising costs are in the form of higher charges per kwh (kilowatt hour), penalties for low pf (power factor) usually below 0.85 pf (if the plant demand is high enough for the utility company to apply the power factor reading for billing, if not then a charge of straight kva is used), and fuel surcharges. With induction motors extensive use and their high consumption of energy, government set standards have been imposed. EPCA of 1975. EPACT 1992. Furthermore the Energy Conservation Program: Energy Conservation Standards for Commercial and Industrial Electric Motors (amended EPCA of 1975) effective Jul. 28, 2014, with compliance starting Jun. 1, 2016. And expired EPACT incentives, the need for energy conservation is apparent.

With the electric motor being at the forefront for energy consumption, there is a specific point where electric motors are at their optimum point of efficiency as to their cost of operation, that is when they are being operated at their full rated horsepower load. Operation in a no load, under loaded or varying loaded state has a great effect on the cost of operation. When the electric motor that are running in a no load, under loaded or varying load, (the majority of induction motors are being operated in an under loaded state, approximately 50-70%) the cost of operation remains high. Because there is not a direct one to one relationship in the percentages between reduction of load to that of the operational characteristics of, or to operational costs of, an induction motor with the ever broadening angle between the real power (kw) and apparent power (kva) vectors, increasing kilovolts-amperes reactive (kvar), and decreasing the power factor (pf) energy waist becomes real apparent. Therefore, any improvement in the ratings of kw, kva, kvar and pf, results in a reduction in the cost of operation (energy used) of these ratings, pf and kvar are the characteristics (ratings) that are focused on for the best efficient use of power (energy), for reducing operational costs (energy consumption) in the induction motor. Maintaining the power factor at a high optimum level, or keeping it in a minimal spectrum of change at a high level in the induction motor, that reduces the kvar need, in any range of, or varying range of loading, including the full horsepower loading has always been and will always be a focus for energy concerns. So as the kvar increases, and pf decreases, a load with a low pf draws more current than a load with a higher pf for the same amount of useful power transferred. A high power factor is desirable since it minimizes the amount of reactive power (kvar) needed by the load, by reducing heat losses, maintaining voltage levels, and maximizing efficiency. With motors being operated in a no load to 50-70% loading, (the majority in the 50-70%) the power factor ratings for these motors, ranges from 0.17 to 0.73. Where on average, the rating at full load is 0.84 and the desired optimal rating for an induction motor is 0.95.

Several options had been presented, for example the use of dual winding motor designs such as in U.S. Pat. No. 7,034,426 and U.S. Pat. No. 7,227,288 granted to Gerald Goche. The 426 patent and 288 patent both disclose single and multiphase electric motors. Both with a main winding of a 2/3 ratio, to the 1/3 ratio of a de-saturation additional winding.

The 426 patent discloses a main winding and a de-saturation winding, wherein said de-saturation winding comprises a current flow in a different phase angle as to the main windings current flow phase angle. Furthermore 426 patent discloses having two conductors, with one conductor being one half the length of the other conductor.

The 288 patent discloses the de-saturation winding having a current flow opposite of the main winding current flow, that generates a field in the opposite direction of the main winding. Furthermore the 288 patent discloses the de-saturation winding having turns at 50-100% of predetermined turns of said main winding.

Furthermore 426 patent discloses a high efficiency, low current motor. On the other hand, 288 patent discloses a very high efficiency electric motor over a broad range of loads. As can be seen in 426 patent and 288 patent, Goche has failed to recognize what is the prime function of any electric motor winding, which is to produce magnetic fields, with specific magnetic flux densities, within varied specific core parts of the electric motor. The de-saturation of any part of the electric motors core has an undesired and unwanted effect, the loss of horsepower and torque, the prime driving force and load carrying function of any electric motor.

Another dual winding designs is disclosed in U.S. Pat. No. 4,187,457 and U.S. Pat. No. 4,446,416 granted to Cravens L. Wanlass. The 457 patent discloses a polyphase electric motor having controlled magnetic flux density, and the 416 patent discloses a polyphase electric machine having controlled flux density. Both patents describe a main winding with series capacitor, and a control winding wherein the stator core of each said patent switches between a non-saturated and a saturated condition.

The 457 patent further discloses a limiting effect of total energy transfer of the capacitor, wherein the end result is a motor that can be operated at maximum flux density, and wherein the capacitors limits energy to the rotor, so rotor current can be maximized. The motor winding inductance's can absorb only so much energy before the magnetic material of the stator saturates and discharges the capacitor. At the moment the motor material saturates, the capacitor discharges through the motor winding and the power source and charge up the capacitor in the opposite polarity.

The 416 patent further discloses that in a low load operation the flux density is low, and as load increases the flux density increases, furthermore that at low load, current flows in opposite directions across radically adjacent windings of the main winding and the control winding, and as load increases becomes increasingly in the same direction.

Wanlass also shows to disclose in 416 patent, a control winding that magnetically overlaps the magnetic poles of the main winding and center of the poles of control winding magnetically located substantially between the poles of the main winding and the control windings are in substantially physical radical alignment. Further discloses that by adding more capacitors you can increase starting torque, or if the control winding was disconnected, the motor would stall.

As can be seen in 457 patent and 416 patent, Wanlass has failed to recognize that the magnetic flux output of the winding is the driving force of the polyphase electric machine/motor, which is to produce horsepower and torque. Wanlass teaches in patent 416 that the current flow is across the two winding designs, then switches to the same direction across the two winding designs. Wanlass has not recognized the true nature of current flow in the polyphase electric machine of said patent 416, where the current flow of a circuit does not change unless the circuitry in itself changes, and that does not happen in said patent 416.

Wanlass in 416 patent, has also not recognized one of the characteristics of a capacitor, that is a capacitor is a resistive device to current flow. Where he explains that by adding capacitors to increase starting torque. With the adding of capacitors, to the already existing capacitor, you are increasing microfarads, therefore allowing more current flow, caused by the reduced resistance of the capacitors circuitry. With the increased current flow in the circuit, more flux is produced. Hence more starting torque. Wanlass explains that the motor would stall without the control winding of patent 416, and has not recognized the characteristics of inductive reactance and capacitive reactance and the result of their properties when combined in the same circuit. Further Wanlass in 457 patent has failed to recognize that the capacitors are constantly switching polarity, because of the use of alternating current. Wanlass details the capacitors charge in the opposite polarity after discharging.

Yet another winding designs are disclose in U.S. Pat. No. 4,808,868 and U.S. Pat. No. 4,959,573 granted to Gary D. Roberts. The 868 patent and 573 patent disclose an electromagnetic induction machine having regulated polar magnetic symmetry. The 868 patent claims a stationary stator circumferentially surround a rotor, and further claims wherein said rotor circumferentially surround said stationary stator of the same claimed machine. Roberts discloses to eliminate or control space harmonics in the air gap, negative sequence currents in the rotor and stator windings and increase efficiency.

The 868 patent discloses that the capacitor stored the unused energy returned to the stator winding and deliver stored energy to the magnetic circuit upon demand. The 573 patent discloses the capacitors deliver stored energy to compensate for additional power requirements.

Another winding designs are disclose in U.S. Pat. No. 6,331,760 granted to Oscar b. McLane Jr. McLane details a capacitive element connected in parallel with and tapped to each phase of a delta or wye connected stator winding, wherein the capacitive elements are alternately charged and discharged during operation, for storing energy from and releasing energy to the winding. Further McLane also discloses another method of reducing eddy current losses, to control flux density and uniformity thereof, in the region of the winding having multiple tap points and core de-saturation to optimize efficiency. Further detailing an improved controlled flux density motor which is comparable in size and weight. McLane details a structure and method that reduces the AC core losses and operates at reduced current under all conditions.

However, McLane has failed to see what the true meaning of motor efficiency is, as so many other inventors have done. They think that reducing the current is an increase in motor efficiency, with no regards for the standards that have been established and used to determine the efficiency rating of a motor. McLane has also failed to see the actual functionality of the capacitive elements and the type of circuitry that is associated with how they are being used in an alternating current circuit. It is also seen that his invention would not be advantageous, with its use of having to create a single or multiple tapped winding and having varying capacitive elements that would need to be constantly adjusted as the load of the motor changes. Use of a single or multiple tapped winding and determining said tap points would require engineering skills and abilities that someone who is skilled in the art of motor rewinding would not have. As for the controlled flux densities, McLane does not recognize, as so many others have also done, that the prime function of the stator winding is to produce magnetic fields, and those magnetic fields have to certain levels of flux densities in the various parts and multiple points in the stator core. That is to produce the horsepower and torque output, no matter what point of operational loading of motor. Furthermore a motor windings output is not determined by its size and weight. McLane's design is complex, of a single operational function, and requires skills far beyond that of someone familiar in the art.

Additionally is U.S. Pat. No. 6,788,031 granted to Larry Stuart Pendell. Pendell discloses an induction machine, more particularly refers to a broad class of electromagnetic machines where force or rotational torque or electrical energy are produced by the interaction of a driven and a generated magnetic field and currents which occurs because of induction. Pendell discloses a generator comprising a rotor which rotates at a speed determined by its design (number of poles, teeth and rotor coils) and capacitors connected to the energy windings or to auxiliary windings creating a self-excited induction generator. Further discloses that if the rotor of induction generator has some residual magnetism simply starting the engine and bringing it up to speed will start the process of establishing flux by induction in auxiliary windings. Pendell further detailing an induction generator, more so a self-excited induction generator, requires some energy source to produce excitation of the field windings. This excitation along with providing mechanical rotation of the conducting loops enables energy stored in the field of the rotor windings to be transferred to an output or energy winding. Further discloses as a motor, an energy source connected to the stator coils, creating a rotating stator field.

Still Pendell has failed to understand the induction generator, or more specifically the self-excited induction generator that uses a rotor, more specifically a cage type rotor that he discloses and the induction motor. This is clearly shown when he describes taking energy from a source (the grid), to produce energy, then send energy back to that source of energy (the grid). He discloses of a multiple winding motor as a generator, though it is actually operating as a motor, by the effect of the grid connection. Pendell further details in varying the speed of his generator as demand changes. In doing this the hertz of his generator would change, and if connected to the grid where the hertz remain constant, some type of catastrophic failure would occur, either in his generator or in the components between his generator and the grid. Pendell fails to realize that generators run at a constant speed, and that as demand changes there are other types of components that are used in conjunction with the generator specifically for demand change. Pendell also fails to see that it requires specific types of equipment and components, that are used to connect to the grid, so as to supply energy to the grid. Pendell's invention is not advantageous for use, do to complexity and probable high cost to manufacture, as to the simple self-excited design when used in conjunction with a grid tie invertor, and to constant speed mechanical drive source.

It is seen that McLane, Pendell, Roberts, Goche and Wanlass have all failed to recognize and to compare the overall characteristics of all their windings in their designs. Furthermore everyone cites that there invention is an improvement in the motors efficiency, without taking into consideration how motor efficiency is calculated. With this in mind, their efficiency ratings based on what they disclose would be over 100 percent. The mandated new requirements by the DOE for improved efficiency ratings for manufactured electric induction motors, of which now includes small motors of 3 horsepower and down, in single and three phase design. The efficiency of any motor has a peak limit of improvement. These new mandates and the costs associated with, the manufactures will pass on in a higher pricing for their motors. There are other types of equipment for power factor improvement (power factor correction), that require a monitoring and switching system so it can auto adjust, for if it did not and the power factor was over corrected, the equipment for which it was installed for could fail, and the associated cost for this power factor correction equipment can be extremely expensive.

Some of the direct costs for low power factor are a penalty for power factor below a predetermined value, or a credit for power factor above that predetermined value. Also charge for kvar hours, straight kva demand and a straight charge on the utility bill for the maximum value of kva used (included in this charge is a charge for kvar, since kvar increases the amount of kva). For it is the kva that the utility companies meter reads, along with the plant power factor (if applied and not a straight kva charge) to get the kwh reading. Other costs of low power factor are indirect, such as loss in efficiency in the equipment operation. There are certain harmonics (standing waves) that are produced by some types of equipment that has a negative effect on other equipment and its efficiency and cost of operation.

There are many in the industry that are oblivious to the effects of low power factor. The effects of low power factor are viewed only as a direct charge, when stated as such on their utility bill. Low power factor also adds a direct cost to the utility company, which is passed on. With everyone focusing on motor efficiency in its self, and not on actual use of the energy that is delivered to the motor and how it is used to operate the motor in all aspects that it can be used efficiently within the confines of an induction motors circuitry.

SUMMARY

The electric motor as disclosed herein, comprises a cage type rotor, of single or polyphase design, and a multiple winding design in a single stator core. The winding design comprises a primary winding and a secondary winding having a magnetically and electric circuit configured alignment, wherein the present configuration provides a 0° difference in the respective magnetic alignments or the electric circuitry alignments, and wherein said magnetically and electric circuit configured alignment are completely separate and isolated from one another, electrically and physically.

The present configuration provides more than one operative function. The prime operative function is configured in a series resonant and a parallel resonant circuit, using capacitors to produce a phase shift in the secondary winding, wherein the ability or possibility to be reconfigured to a secondary operative function, identical to the original winding and in all of its original operative designed functions.

Another object of the present invention and in accordance with the principle of the present disclosure the exemplary embodiment discloses the plurality of the primary winding lead end connections being of the same configuration of the original winding plurality of lead end connections, and type of connection. This exemplary embodiment when connected to, or energized by, the appropriate power source creates identical magnetic field patterns to that of the original winding magnetic field patterns.

Another objective of the present disclosure is to provide the addition of the secondary winding plurality of lead end connections, of which is identical to the primary winding plurality of lead end connections, and in the same type of connection, creates a magnetic field patterns identical to the primary winding magnetic field patterns whether in the prime operative or secondary operative function of the multiple winding designed motor.

Yet another objective of the present invention is to provide a prime operative function which incorporates a parallel resonant/tank circuit and a series resonant circuit. During prime operative function the primary winding provides the inductive half of the parallel resonant/tank circuit, and the secondary winding provides the inductive half of the series resonant circuit, wherein said secondary winding is connected in the same connection type as the primary winding in a reversed magnetic polarity. Further corresponding capacitors that are connected in series with the secondary winding connection, creates a series resonant circuit, wherein the capacitors in this series resonant circuit cause a phase shift in the current of the circuit. The phase shift created by series resonant circuit reverses the magnetic field patterns of the secondary winding and aligning them with the magnetic field patterns of the primary winding creating the same functional magnetic field patterns of the original winding, with the capacitors supplying kvar/reactive power to the motor.

Yet another object of the present disclosure is to provide a prime operative function that can be configured for permanent operation of, or reconfigured for the secondary operative function, wherein the changed between the two operative functions can be achieved manually or with the use of the switchable control unit.

Also another objective of the present disclosure is to provide a secondary function, wherein the primary winding lead ends and connection type, with the corresponding secondary lead ends and matching connection type, when conjoined together and to the appropriate power source create magnetic field patterns identical in all aspects to the original winding magnetic field patterns.

Still another object of the present disclosure is to provide a primary winding and secondary winding, combining the plurality of all data of each aspect of each winding, that combined data in each aspect shall be one in the same, identical to the original winding data's aspects, whether in the prime operative function or secondary operative function of the multiple winding designed motor.

The disclosure itself, both as to its configuration and its mode of operation will be best understood, and additional objects and advantages thereof will become apparent, by the following detailed description of a preferred embodiment taken in conjunction with the accompanying drawings.

The Applicant hereby asserts, that the disclosure of the present application may include more than one invention, and, in the event that there is more than one invention, that these inventions may be patentable and non-obvious one with respect to the other.

BRIEF DESCRIPTION OF THE DRAWINGS

The accompanying drawings, which are incorporated herein, constitute part of the specification and illustrate the preferred embodiment of the disclosure.

DESCRIPTION OF THE PREFERRED EMBODIMENT

Figure 1A:
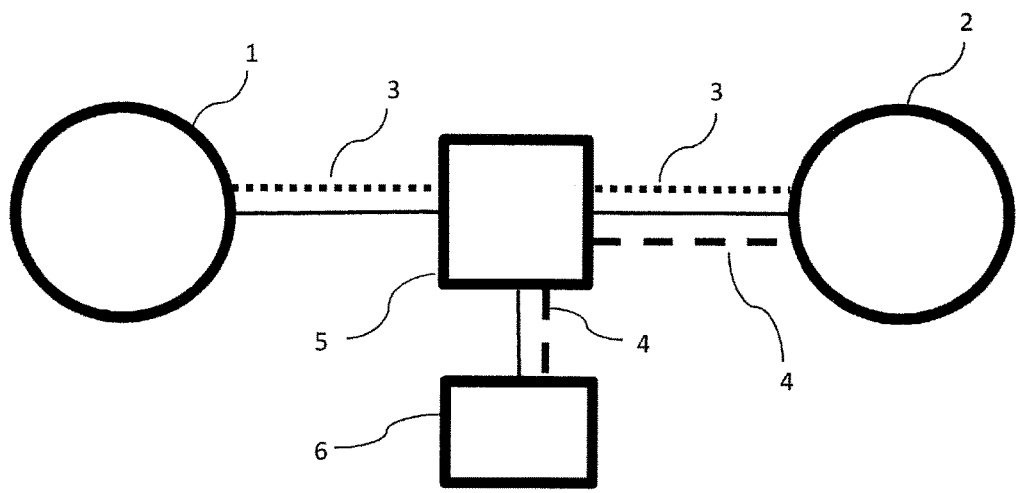
FIG. 1a is an generally illustration of the KW and KVAR flows of the Multiple Winding designed motor in the prime operative mode with use of the switchable control unit, being activated in accordance with the principles of the present disclosure.
Figure 2A:
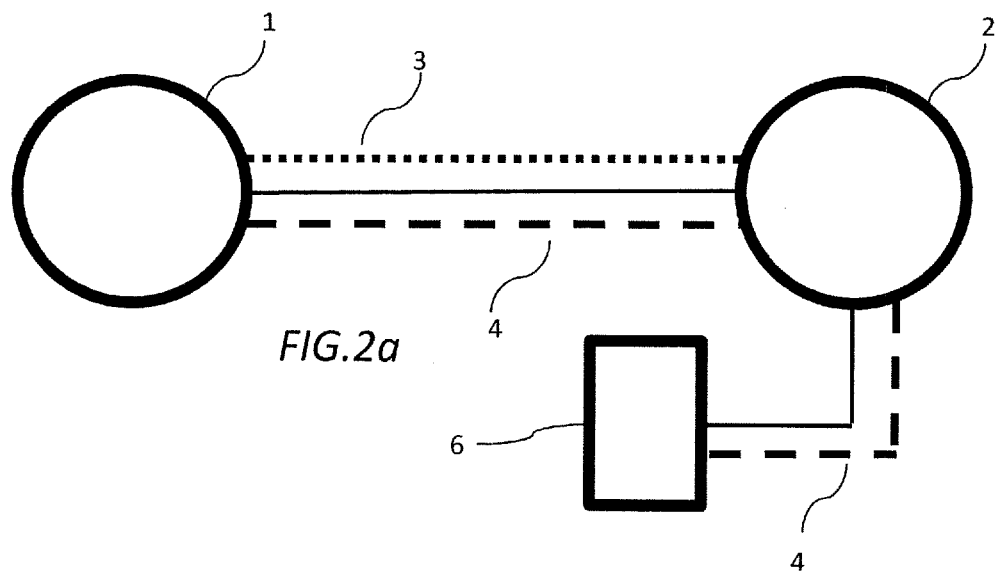
FIG. 2a is an exemplary illustration of the KW and KVAR flows of the Multiple Winding designed motor in the prime operative mode without the switchable control unit, manually configured in accordance with the principles of the present disclosure.
Figure 12:
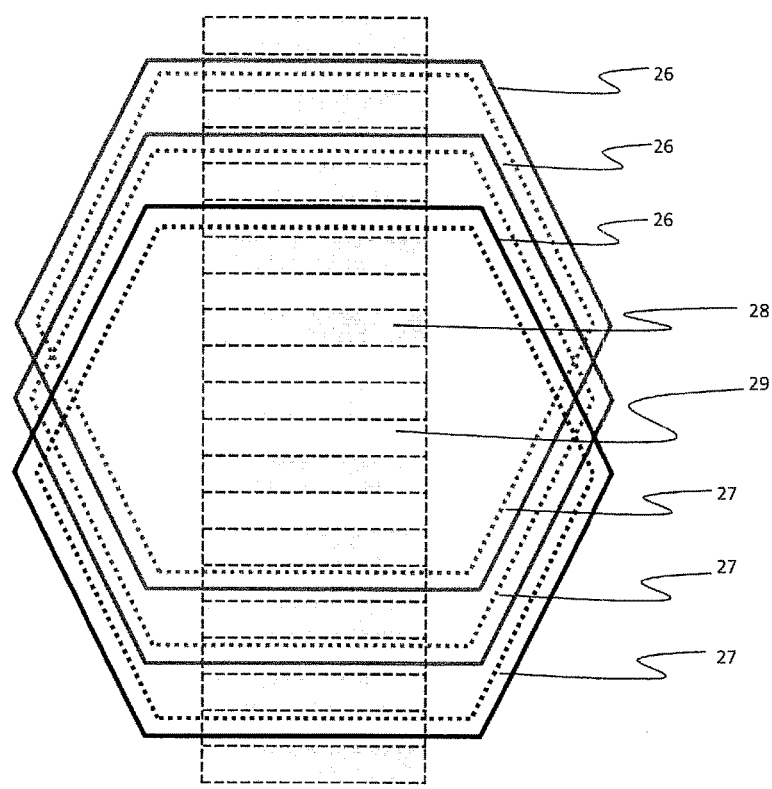
FIG. 12 is an diagrammatical illustration of a lap type winding for in slot coil alignment for the Multiple Winding design in accordance with the principles of the present disclosure.
Figure 13:
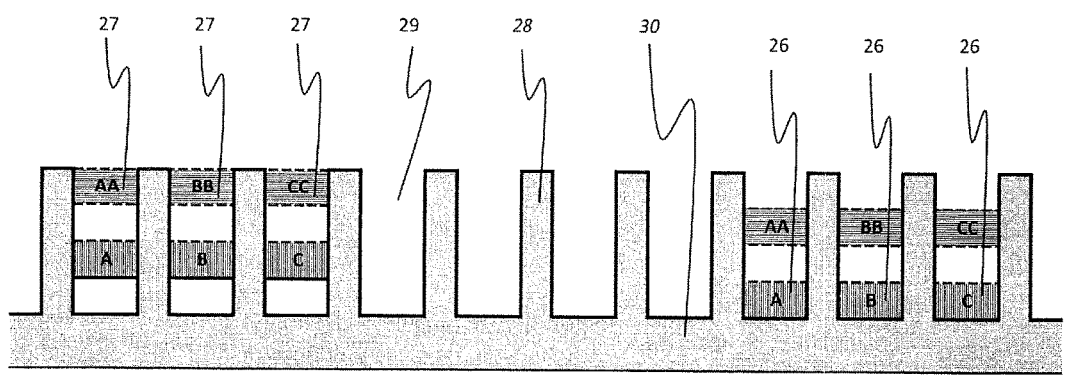
FIG. 13 is a diagrammatical illustration of a lap type winding coil layering and coil alignment in the stator core slots for the Multiple Winding design in accordance with the principles of the present disclosure.

Referring to FIGS. 1a and 2a illustrative flows of KW 3 and KVAR 4, of induction motor 2, of which said motor comprises a cage type rotor, a laminated stator core 30, with a plurality of stator core slot rows 29, and stator core tooth rows 28, having a primary winding 13, and secondary winding 14. The primary winding 13, has a corresponding plurality of primary winding coils 26, and a corresponding plurality primary winding coil groups 18, with the secondary winding 14, having a corresponding plurality of secondary winding coils 27, and corresponding secondary winding coil groups 19. The primary 13 and secondary 14 windings and their plurality of coils 26 and 27, and primary winding plurality of coil groups 18 and secondary winding plurality of coil groups 19, being of the same to each other and corresponding to the original windings plurality of coils and coil groups 16 wound in the laminated stator core 30 in the same configurative layout as the original windings configurative layout. FIG. 12 and FIG. 13 shows a lap type winding for alignment of the secondary winding coils 27, and secondary winding coil groups 19, to that of the primary winding coils 26 and primary winding coil groups 18, with the primary winding 13 being a diagrammatical representation of the original winding coils and coil groups 16.

Figure 14:
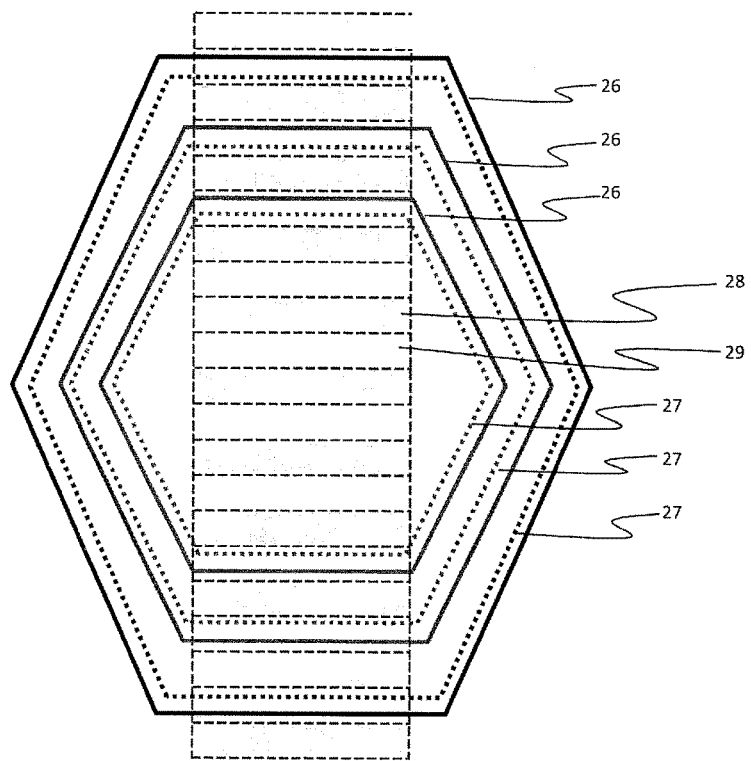
FIG. 14 is a diagrammatical illustration of a concentric type winding in slot coil alignment for the Multiple Winding design in accordance with the principles of the present disclosure.
Figure 15:
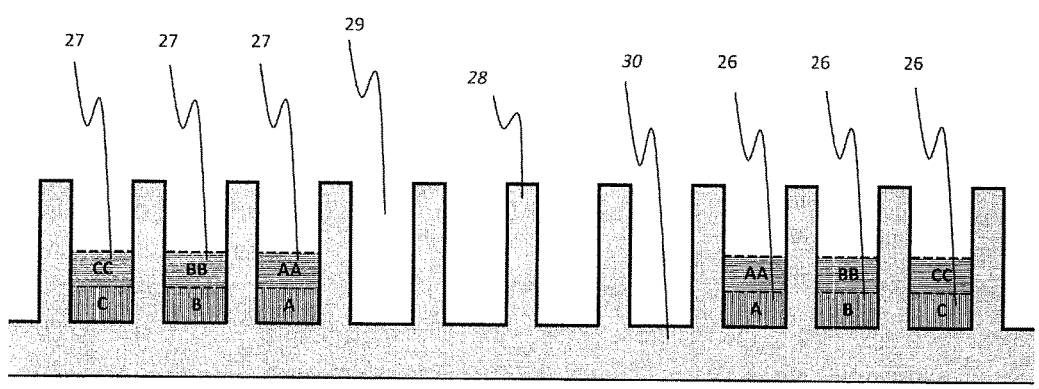
FIG. 15 is a diagrammatical illustration of a concentric type winding coil layering and coil alignment in the stator core slots for the Multiple Winding design in accordance with the principles of the present disclosure.

FIGS. 14 and 15 discloses a concentric type winding for alignment of the secondary winding coils 27 and secondary winding coil groups 19, to that of the primary winding coils 26 and primary winding coil groups 18 with the primary winding 13 being a grammatical representation of the original windings coils and coil groups 16.

Figure 10:
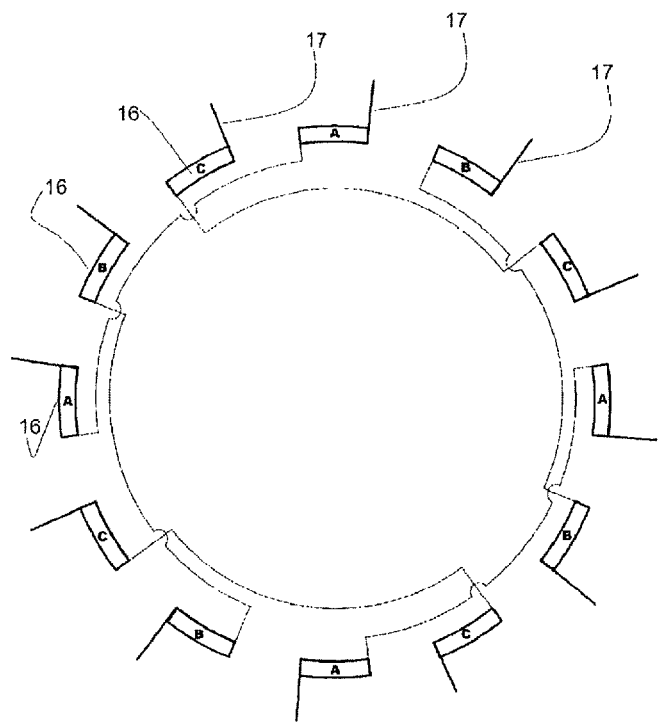
FIG. 10 is a NEMA diagram for a 4-pole 3-phase winding for Wye and Delta configured connections in accordance with the principles of the present disclosure.
Figure 11:
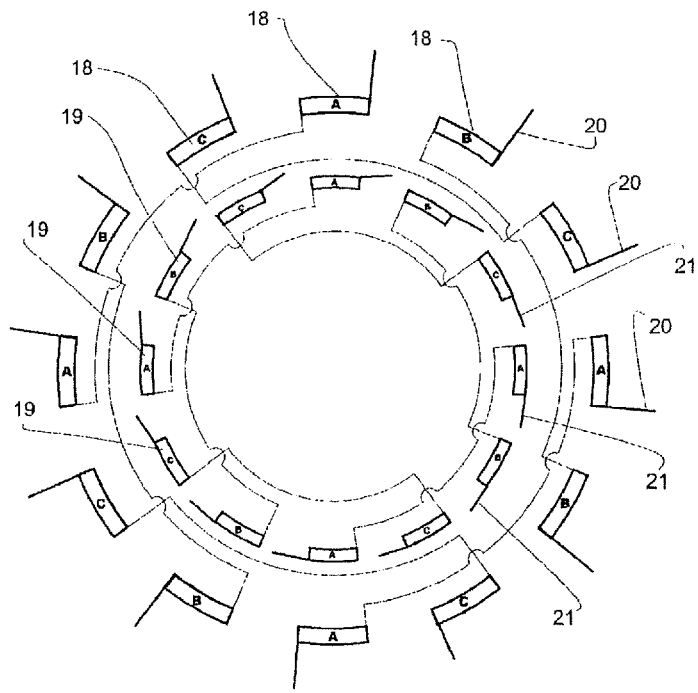
FIG. 11 is a Multiple Winding diagram for a 4-pole 3-phase winding for use in either a Wye or Delta configured connection in accordance with the principles of the present disclosure.

Further detailing the primary winding coil lead 20 layout, as shown in FIG. 11, being of the same configuration as the original windings coil lead 17 layout, as shown FIG. 10, with the secondary winding coil lead 21 layout, as shown in FIG. 11, which is also the same configuration as the primary winding coil lead 20 layout. With the turns of the primary winding 13 and secondary winding 14 being one in the same as to the original windings turns, and the primary winding 13 and secondary winding 14 connections being one in the same as to the original windings connections, as shown in FIG. 10 and FIG. 11. Further one exception is the use of an open type circuit configuration, WYE/DELTA connection in order to keep all winding types and phases separate and isolated from one another, with no conjoined interconnections between them.

Chording of the primary winding 13 and secondary winding 14 shall be in the same/identical to the original windings chording, that being they are all identical to each other, that is no change in the chording from one winding to any other winding. Primary winding 13 circular mil areas is on average 79% of the original windings circular mil area, and the secondary winding 14 circular mil area is on average 22% of the original windings circular mil area. Therefore the primary winding 13 and secondary winding 14 have an average sizing to that of the original windings wire sizing, as to American Wire Gauge sizing and circular mil areas. With the combining of the primary winding 13 circular mil area and the secondary winding 14 circular mil area, totaling an average of 101-103% of the original windings circular mil area.

Capacitors 6 values in microfarads are calculated in accord with the percent of the secondary winding 14 circular mil area sizing. Where said percent multiplied by the E I rating for a non-closed loop winding with 500% intensification, and closed loop winding being 50% of the non-closed loop winding.

Figure 4:
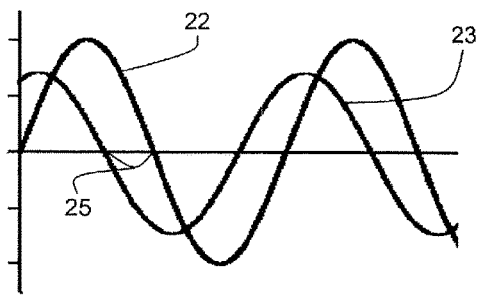
FIG. 4 is an oscilloscope trace representation of voltage and current sine waves of a capacitive circuit having a leading current in accordance with the principles of the present disclosure.

As shown in FIGS. 1a and 2a, during the prime operative function, inductive motor 2, energy KW 3 flows between the appropriate power source 1, switchable control unit 5, and inductive motor 2, while energy KVAR 4 flows between inductive motor 2, switchable control unit 5, and capacitors 6, as shown in FIG. 1a or as shown in FIG. 2a energy KW 3 flows between the power source and induction motor 2, while energy KVAR 4 flows between induction motor 2 and capacitors 6. The capacitors 6 is introduced/connected between the primary winding 13 and secondary winding 14, wherein the capacitors 6 leading current 23, as shown in FIG. 4, causes a phase shift in the reversed connected circuitry of the secondary winding 14, as to that of the primary winding 13 circuitry, in order to realign the magnetic field polarities of the secondary winding 14 to that of the magnetic field polarities of the primary winding 13. As result the magnetic field polarities of the primary winding 13 and secondary winding 14 are one in the same to each other and creating magnetic field polarities and patterns identical to the original windings magnetic field polarities and patterns.

Figure 5:
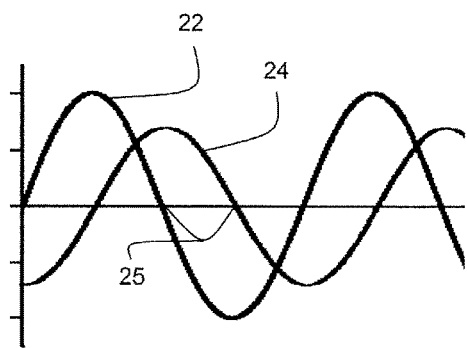
FIG. 5 is an oscilloscope trace representation of the voltage and current sine waves of an inductive circuit having a lagging current in accordance with the principles of the present disclosure.
Figure 6:
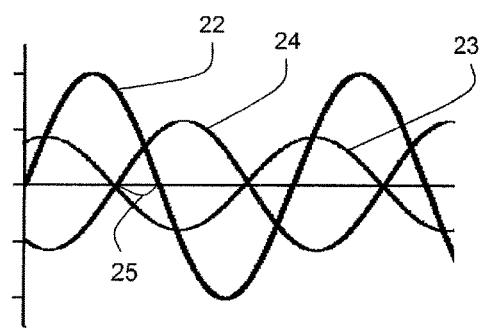
FIG. 6 is an oscilloscope trace representation of voltage and current sine waves of a paralleled resonant/tank circuit in accordance with the principles of the present disclosure.

FIG. 5 discloses the primary winding 13 current flows being lagging. The paralleling of the primary winding 13 circuitry to the secondary winding 14 circuitry, with capacitors separating the primary winding 13 from the secondary winding 14, would have current flow 23 and current flow 24 to the voltage 22, as shown in FIG. 6, if the secondary winding 14 was not in a reverse circuitry connection to that of the primary winding 13 circuitry connection.

Figure 7:
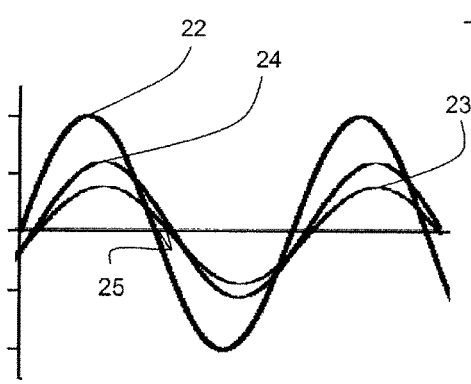
FIG. 7 is a representation of an oscilloscope trace of voltage and current sine waves of the paralleled resonant/tank circuit with the phase shift in the series resonant circuit of the secondary winding circuitry in accordance with the principles of the present disclosure.

Yet with the reversing of the secondary winding 14 circuitry connections to that of the primary winding 13 circuitry connections and the phase shift from the capacitors 6 in the secondary winding 14, as shown in FIG. 7, the alignment of the primary winding current 24 and the secondary winding current 23 will end up being in phase, more particularly with a closer alignment of/in phase to the voltage 22. The result is an improved angle 25, as shown on the time line of the trace, between voltage 22, current flow 23 and current flow 24, wherein said angle 25 represents the power factor on the time line, wherein the improvement is more apparent when compared the angle 25 between voltage and currents on the time lines of, in FIG. 4 through FIG. 6.

Figure 3A:
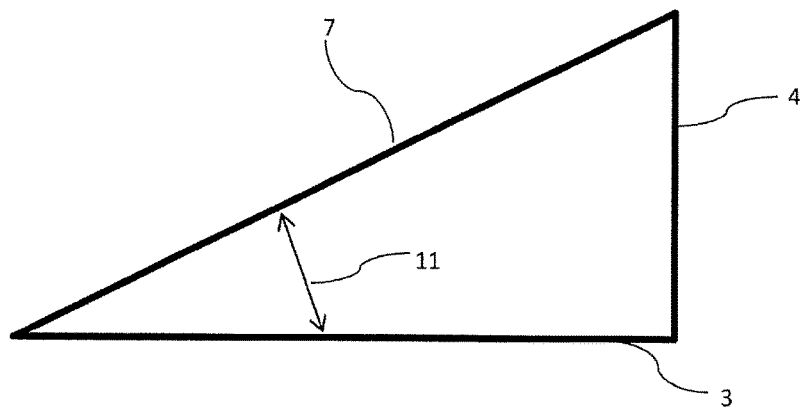
FIG. 3a is a representation of a Power Triangle in accordance with the principles of the present disclosure.
Figure 3B:
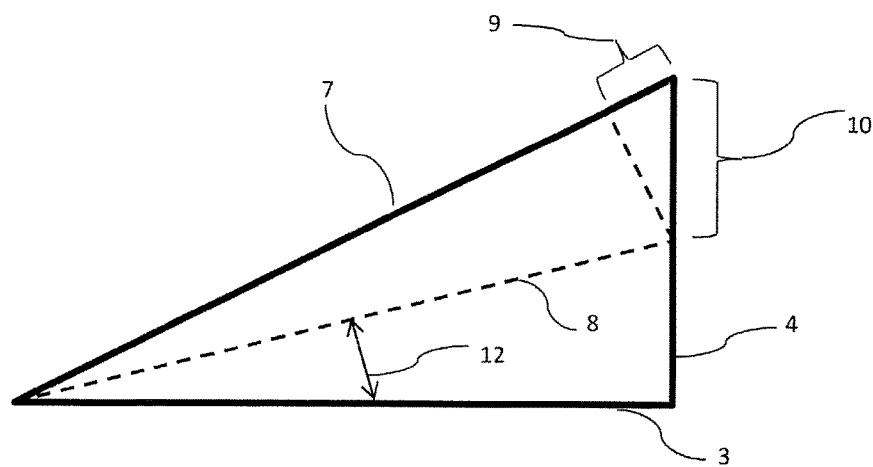
FIG. 3b is a representation of the Power Triangle of improved Power Factor with an improved Power Factor from FIG. 3a, reduced KVA demand and reduced KVAR in accordance with the principles of the present disclosure.
Figure 3C:
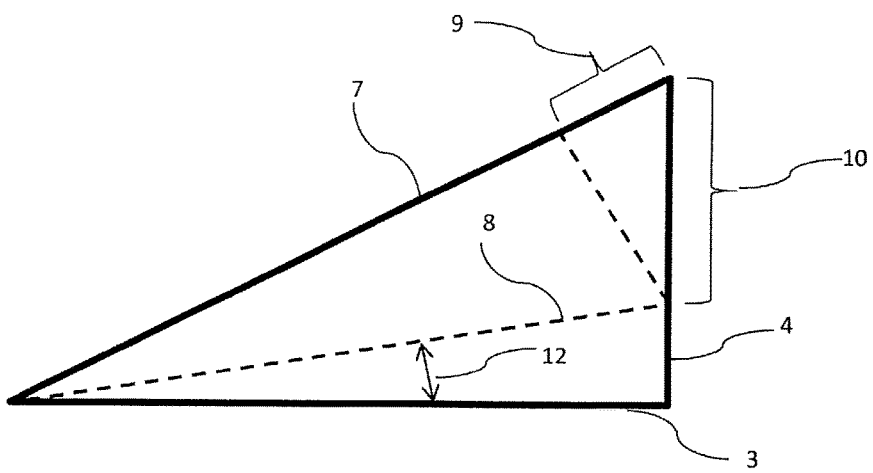
FIG. 3c is a representation of the Power Triangle of greater improved Power Factor, greater reduced KVA demand and greater reduced KVAR than that of FIG. 3b in accordance with the principles of the present disclosure.

The power triangle reference, as shown in FIG. 3a, gives further detailing of FIG. 5, wherein the power factor angle 25 is represented as the pf angle 11 between KW vector 3 and KVA vector 7. FIGS. 3b and 3c gives further detailing to FIG. 7 and the prime operative function. FIGS. 3b and 3c shows the improved power factor 12, between the KW vector 3 and the KVA vector 8, with reduced KVA demand 9, and KVAR 4 reduction from the appropriate power source 1, by the KVAR 10 supplied by the resonant circuitry.

Figure 1B:
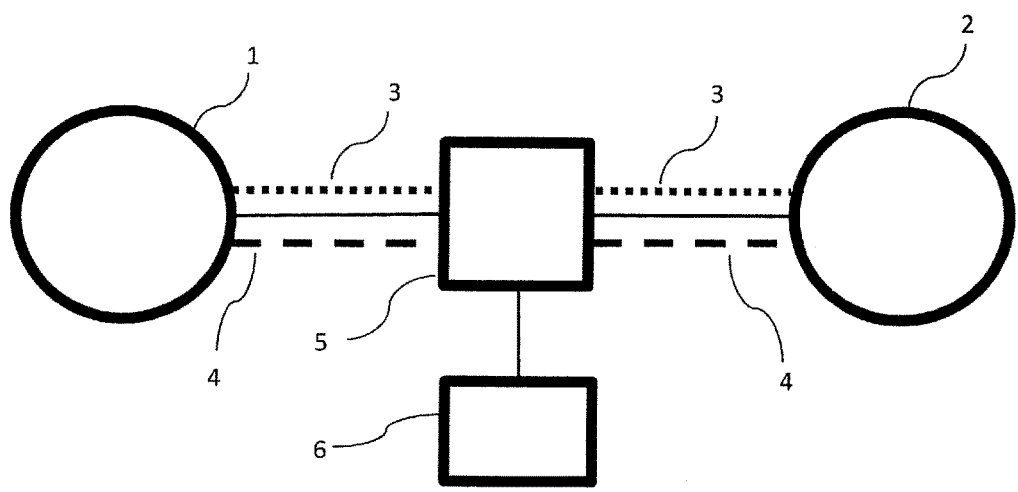
FIG. 1b is an generally illustration of the KW and KVAR flows of the Multiple Winding designed motor in the secondary operative mode with use of the switchable control unit, not activated in accordance with the principles of the present disclosure.
Figure 8:
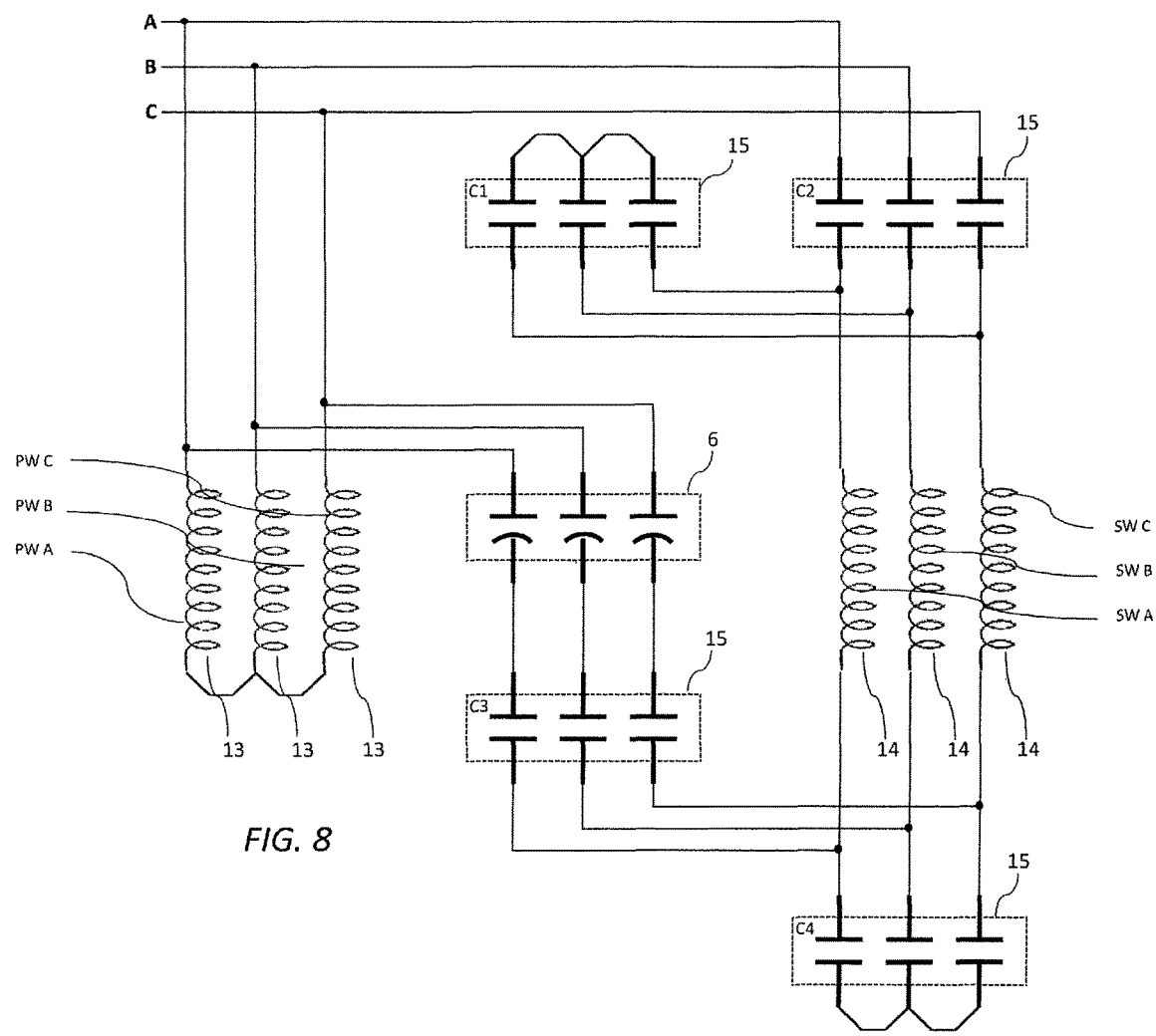
FIG. 8 is a schematic diagram of the Multiple Winding designed motor with the switchable control unit for a Wye configured winding in accordance with the principles of the present disclosure.
Figure 9:
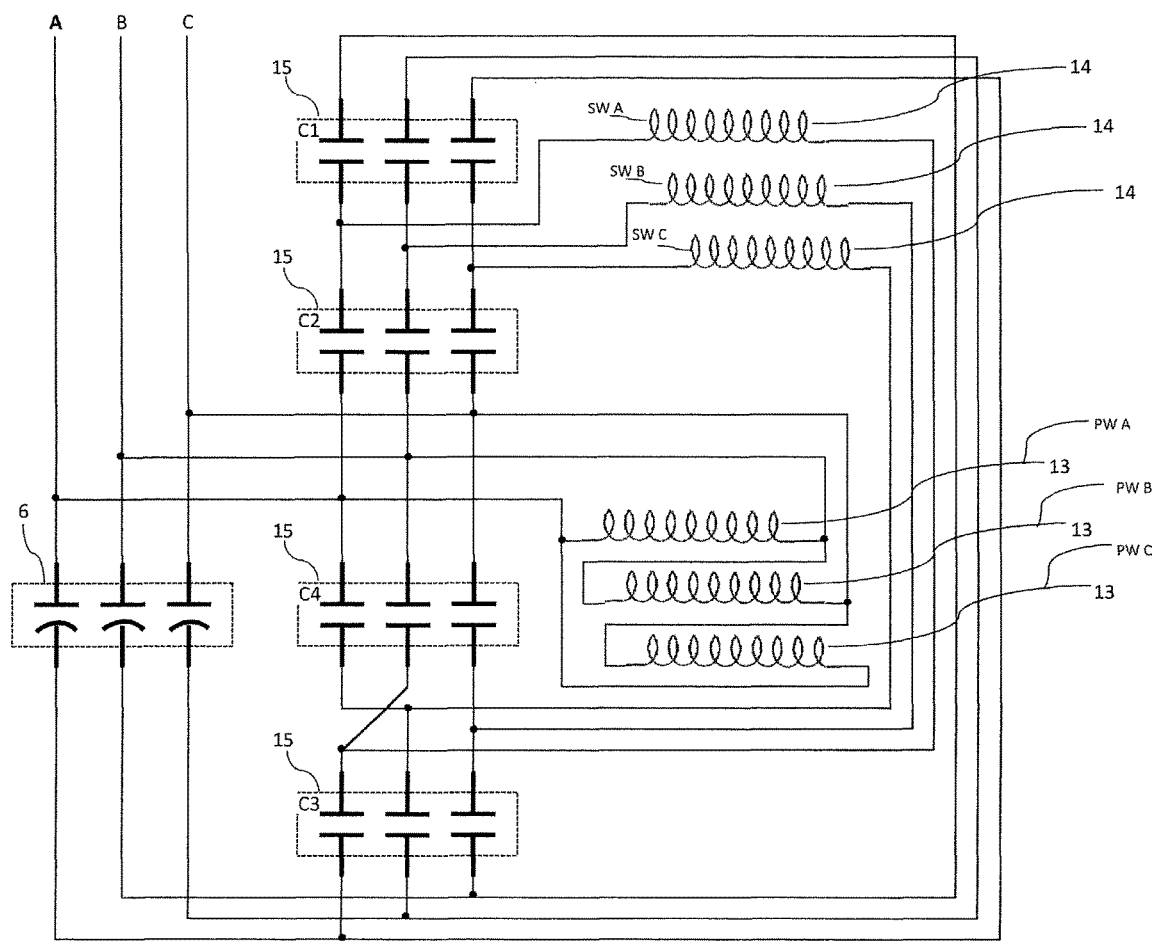
FIG. 9 is a schematic diagram of the Multiple Winding designed motor with the switchable control unit for a Delta configured winding in accordance with the principles of the present disclosure.

KW 3 and KVAR 4 flows, as shown in FIG. 1a and FIG. 1b, through the use of switchable control unit 5 when control unit 5 is activated in the prime operative function. As shown in FIG. 8 and FIG. 9 contactors 15 C1 and 15 C3, energize into a closed contact operation, wherein contactors 15 C1 and 15 C3 reverse the aligned circuitry of the secondary winding 14, as to that of the primary winding 13 circuitry, and with capacitors 6 being the interconnecting components between the primary winding 13 and secondary winding 14. For the secondary operative function of switchable control unit 5, as shown in FIG. 8 and FIG. 9, contactors 15 C2 and 15 C4 energize into a closed contact operation, wherein contactors 15 C2 and 15 C4 connect the aligned circuitry of the secondary winding 14 to the primary winding 13 circuitry. This results in KW 3 and KVAR 4 flows, as referenced in FIG. 1b, between appropriate power source 1 and inductive motor 2 with capacitors 6 not in a closed circuit connection. The KW 3 and KVAR 4 flows of FIGS. 2a and 2b without the switchable control unit 5, are a result of manually wired external lead terminations of the induction motor 2, appropriate power source 1 for secondary operative function, and capacitors 6 if prime operative function. FIG. 2a, KW 3 and KVAR 4 flows relates to the prime operative function and FIG. 2b, KW 3 and KVAR 4 flows relates to the secondary operative function.

Figure 2B:
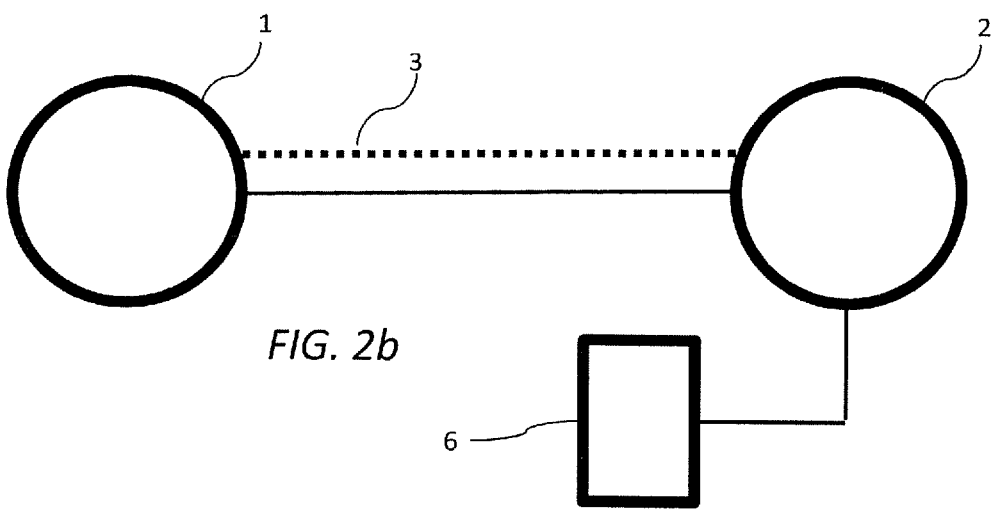
FIG. 2b is an exemplary illustration of the KW and KVAR flows of the Multiple Winding designed motor in the secondary operative mode without the switchable control unit, manually configured in accordance with the principles of the present disclosure.
Figure 16:
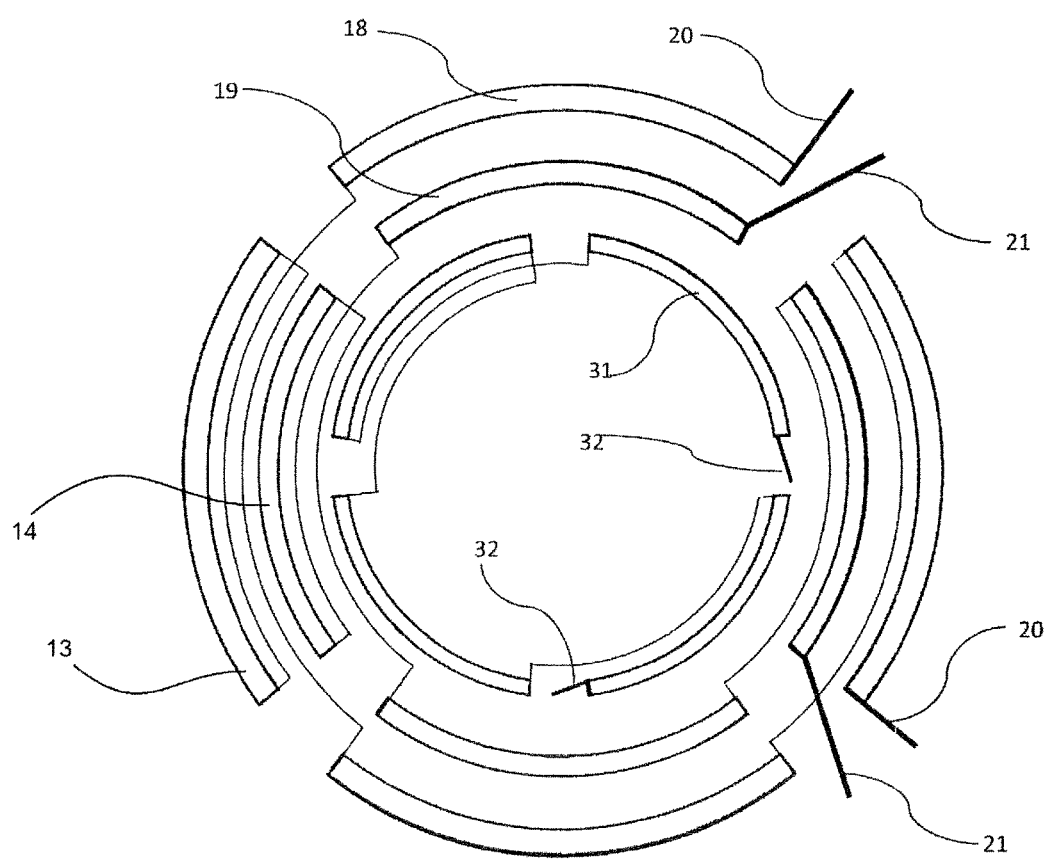
FIG. 16 is a schematic diagram for a 4-pole single phase Multiple Winding design in accordance with the principles of the present disclosure.

FIG. 16 discloses a schematic diagram example for single phase prime operative function, through the reverse connecting of secondary winding 13, as to the primary winding 14 with capacitors 6 being the interconnecting components between them. Will result in, referenced FIG. 2a, KW 3 and KVAR 4 flows. Further in secondary operative function, wherein the secondary winding 14 circuitry and primary winding 13 circuitry are conjoined resulting, as shown in FIG. 2b, KW 3 and KVAR 4 flows with the start/aux winding 31 and start/aux winding lead end 32 and all its configured original design will remain unchanged.

For one skilled in the art, certain changes may be made in the above construction, without departing from the scope of the invention, and is not limited to the particular physical construction of the motors illustrated or described. Drawings and descriptions are meant to be illustrative and not restrictive.

The disclosure is not limited to the precise configuration described above. While the disclosure has been described as having a preferred design, it is understood that many changes, modifications, variations and other uses and applications of the subject disclosure will, however, become apparent to those skilled in the art without materially departing from the novel teachings and advantages of this disclosure after considering this specification together with the accompanying drawings. Accordingly, all such changes, modifications, variations and other uses and applications which do not depart from the spirit and scope of the disclosure are deemed to be covered by this disclosure as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present disclosure, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

The invention claimed is:

1. An electric motor, with a cage type rotor, of single or polyphase design comprising:
    a multiple winding design in a single stator core;
    wherein the multiple winding design comprises a primary winding circuitry and secondary winding circuitry;
    an original winding comprising an original operative designed function;
    wherein the primary winding circuitry and secondary winding circuitry comprises a magnetically alignment and electric circuit alignment,
    wherein said magnetic alignments alignment between said primary winding and said secondary winding is a 0° degree difference;
    wherein said electric circuitry alignments between said primary winding and said secondary winding is a 0° degree difference;
    wherein the primary winding circuitry and secondary winding circuitry are electrically separate and isolated;
    wherein the primary winding circuitry and secondary winding circuitry are physically separated and isolated;
    wherein said multiple winding design comprises a prime operative function and a secondary operative function;
    wherein said prime operative function comprises at least one series resonant circuit and at least one parallel resonant circuit to produce a phase shift in the secondary winding, wherein said series resonant circuit comprises plurality of capacitors, wherein said parallel resonant circuit comprises plurality of capacitors; and
    wherein the primary winding and secondary winding comprises the structural arrangement to be switched to a secondary operative function identical to the original winding and said original operative designed function.

2. The electric motor of claim 1 comprising:
    a cage type rotor;
    a stator core having a plurality of slots;
    said primary winding having a plurality of primary winding coils, at least a primary winding stator core lead end, and a primary winding layout, said original winding comprising a plurality of original windings coils, at least an original winding stator core lead end and an original winding layout;
    wherein said plurality of primary winding coils are arranged in said stator core corresponding said plurality of original windings coils;
    said secondary winding having a plurality of secondary winding coils, at least a secondary winding stator core lead end and a secondary winding layout, wherein said secondary winding coils are arranged in said stator core corresponding to the primary winding plurality of coils;
    wherein the primary winding layout in the stator core corresponds to the original winding layout in the stator core;
    wherein the secondary winding layout corresponds to the primary winding layout in the stator core;
    wherein the primary winding stator core lead end, along with the corresponding secondary winding stator core lead, and with capacitors, are connected so as to be configured in the primary mode of operation; and
    wherein the primary stator core lead end with the corresponding secondary winding stator core lead end is connected to configured in the secondary mode of operation.

3. The electric motor of claim 2, wherein the original winding plurality of coils is recalculated by use of a redesign method of the original winding for a new coil plurality of the original winding.

4. The electric motor of claim 3, wherein the use of redesign method comprises the primary winding plurality corresponding to said new plurality of coils for the original winding.

5. The electric motor of claim 3, wherein the primary winding turns are one in the same as to that of the original winding turns in said redesign method.

6. The electric motor of claim 4, wherein the use of redesign method comprises the secondary winding plurality of coils corresponding to said new plurality of coils.

7. The electric motor of claim 2, wherein the primary winding turns are one in the same as to that of the original winding turns.

8. The electric motor of claim 7, wherein the secondary winding turns corresponds to that of the primary winding turns.

9. The electric motor of claim 2, wherein the original winding circuitry layout corresponds to an applied operational voltage that the electric motor shall be operate on.

10. The electric motor of claim 9, wherein the primary winding circuitry layout corresponds to the original winding circuitry layout.

11. The electric motor of claim 9, comprising a polyphase electric motor, wherein the primary winding circuitry comprises an open circuit connection, wherein each winding phase are individually separated and unto their own phase circuitry with no connecting circuits between each winding phase.

12. The electric motor of claim 11, wherein the secondary winding circuitry correspond to the primary winding circuitry, wherein each winding phase are individually separated and unto their own phase circuitry with no connecting circuits between each winding phase.

13. The electric motor of claim 12, wherein the primary winding comprises a primary winding chord factor; wherein the primary winding chord factor correspond to that of the original chord factor.

14. The electric motor of claim 2, wherein the original winding comprises an original chord factor.

15. The electric motor of claim 2, wherein said primary mode of operation the at least series resonant comprises the primary winding lead end connected with secondary winding lead end by means of at one of said plurality of capacitors;
    and the parallel resonant circuit circuitry comprises the primary winding lead end connected with secondary winding lead end by means of at one of said plurality of capacitors; and wherein said connections were reverse connected and magnetically aligned.

16. The electric motor of claim 2, wherein said secondary mode of operation the primary winding lead end connects to the secondary winding lead end, wherein said connection is magnetically aligned winding identical to the original winding.

17. The electric motor of claim 1, wherein original winding comprises original winding poles, wherein each original winding pole is set as per its plurality of slots, plurality of coils, and its circuitry layout;

wherein primary winding comprises primary winding poles, wherein each primary winding pole is one in the same as the original winding pole, wherein secondary winding circuitry comprises secondary winding poles, wherein each secondary winding pole is one in the same as the primary winding pole, wherein the each secondary winding pole comprises zero degree difference between the two for magnetic alignment.

18. The electric motor of claim 1, wherein said at least series resonant circuit joined said secondary winding and said primary winding generating said at least one parallel resonant circuit.

* * * * *